United States Patent
Arges et al.

(10) Patent No.: US 8,799,908 B2
(45) Date of Patent: *Aug. 5, 2014

(54) HARDWARE-ENABLED LOCK MEDIATION FOR CONTROLLING ACCESS TO A CONTESTED RESOURCE

(75) Inventors: Christopher J. Arges, Austin, TX (US); Nathan D. Fontenot, Georgetown, TX (US); Joel H. Schopp, Austin, TX (US); Michael T. Strosaker, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 79 days.

This patent is subject to a terminal disclaimer.

(21) Appl. No.: 13/458,540

(22) Filed: Apr. 27, 2012

(65) Prior Publication Data

US 2013/0007323 A1    Jan. 3, 2013

Related U.S. Application Data

(63) Continuation of application No. 13/172,658, filed on Jun. 29, 2011, now abandoned.

(51) Int. Cl.
*G06F 9/46* (2006.01)
*G06F 9/44* (2006.01)

(52) U.S. Cl.
USPC ............................. 718/100; 718/104; 710/200

(58) Field of Classification Search
None
See application file for complete search history.

(56) References Cited

U.S. PATENT DOCUMENTS

| | | | |
|---|---|---|---|
| 7,478,204 B2 * | 1/2009 | McKenney et al. | 711/151 |
| 7,752,620 B2 | 7/2010 | Accapadi et al. | |
| 8,132,173 B2 | 3/2012 | Manczak et al. | |
| 8,402,464 B2 | 3/2013 | Dice et al. | |
| 2002/0138544 A1 * | 9/2002 | Long | 709/107 |
| 2006/0130062 A1 * | 6/2006 | Burdick et al. | 718/100 |
| 2009/0089790 A1 | 4/2009 | Manczak et al. | |
| 2010/0011360 A1 * | 1/2010 | Fontenot et al. | 718/100 |
| 2010/0031265 A1 | 2/2010 | Koning et al. | |
| 2010/0077394 A1 | 3/2010 | Wang et al. | |
| 2010/0138841 A1 | 6/2010 | Dice et al. | |
| 2010/0262966 A1 | 10/2010 | Dow et al. | |
| 2010/0293553 A1 * | 11/2010 | Kukanov et al. | 718/108 |
| 2013/0007322 A1 | 1/2013 | Arges et al. | |

OTHER PUBLICATIONS

Arges, et al., "Hardware Enabled Lock Medication" filed on Jun. 29, 2011, assigned U.S. Appl. No. 13/172,658, 35 pages.
Non-final office action dated Apr. 3, 2013 regarding U.S. Appl. No. 13/172,658, 15 pages.
Notice of allowance dated Jun. 26, 2013 regarding U.S. Appl. No. 13/172,658, 6 pages.

* cited by examiner

*Primary Examiner* — Meng An
*Assistant Examiner* — Benjamin Wu
(74) *Attorney, Agent, or Firm* — Yee & Associates, P.C.; Parashos Kalaitzis

(57) ABSTRACT

A computer implemented method for control access to a contested resource. When a lock acquisition request is received from a virtual machine, the partition management firmware determines whether the lock acquisition request is received within a preemption period of a time slice allocated to the virtual machine. If the lock acquisition request is received within the preemption period, the partition management firmware ends the time slice early, and performs a context switch.

11 Claims, 6 Drawing Sheets

HARDWARE-ENABLED LOCK MEDIATION FOR CONTROLLING ACCESS TO A CONTESTED RESOURCE

This application is a continuation of application Ser. No. 13/172,658, filed Jun. 29, 2011, status pending.

BACKGROUND

1. Field

The disclosure relates generally to a computer implemented method, a computer usable program code, and a data processing system. More specifically, the present disclosure relates to a computer implemented method, a computer usable program code, and a data processing system for controlling access to a contested resource.

2. Description of the Related Art

Increasingly large symmetric multi-processor data processing systems are not being used as single large data processing systems. Instead, these types of data processing systems are being partitioned and used as smaller systems. These systems are also referred to as logical partitioned (LPAR) data processing systems. A logical partitioned functionality within a data processing system allows multiple copies of a single operating system or multiple heterogeneous operating systems to be simultaneously run on a single data processing system platform. A partition, within which an operating system image runs, is assigned a non-overlapping subset of the platform's resources. These platform allocable resources include one or more architecturally distinct processors and their interrupt management area, regions of system memory, and input/output (I/O) adapter bus slots. The partition's resources are represented by the platform's firmware to the operating system image.

Each distinct operating system or image of an operating system running within a platform is protected from each other, such that software errors on one logical partition cannot affect the correct operation of any of the other partitions. This protection is provided by allocating a disjointed set of platform resources to be directly managed by each operating system image and by providing mechanisms for ensuring that the various images cannot control any resources that have not been allocated to that image. Furthermore, software errors in control of an operating system's allocated resources are prevented from affecting the resources of any other image. Thus, each image of the operating system, or each different operating system, directly controls a distinct set of allocable resources within the platform.

With respect to hardware resources in a logical partitioned data processing system, these resources are shared disjointly among various partitions. These resources may include, for example, input/output (I/O) adapters, memory DIMMs, non-volatile random access memory (NVRAM), and hard disk drives. Each partition within a logical partitioned data processing system may be booted and shut down over and over without having to power-cycle the entire data processing system.

Each distinct operating system or image of an operating system running within a platform is implemented using a partition management firmware, such as PowerVM, which is available from International Business Machines Corporation. In systems that contain a partition management firmware and many guest operating systems, performance is a major concern. Each guest operating system has at least one virtual central processing unit (VCPU). The partition management firmware controls access to a physical central processing unit (CPU) core by the guest operating systems and allocates time slices during which each VCPU gets to execute on the physical CPU core. It is often the case that the total number of VCPUs for all the guest operating systems is greater than the number of physical CPUs in the system.

SUMMARY

The different illustrative embodiments provide a computer implemented method, computer usable program code, and a data processing system for control access to a contested resource. When a lock acquisition request is received from a virtual machine, the partition management firmware determines whether the lock acquisition request is received within a preemption period of a time slice allocated to the virtual machine. If the lock acquisition request is received within the preemption period, the partition management firmware ends the time slice early, and performs a context switch.

DETAILED DESCRIPTION

Figure 1:
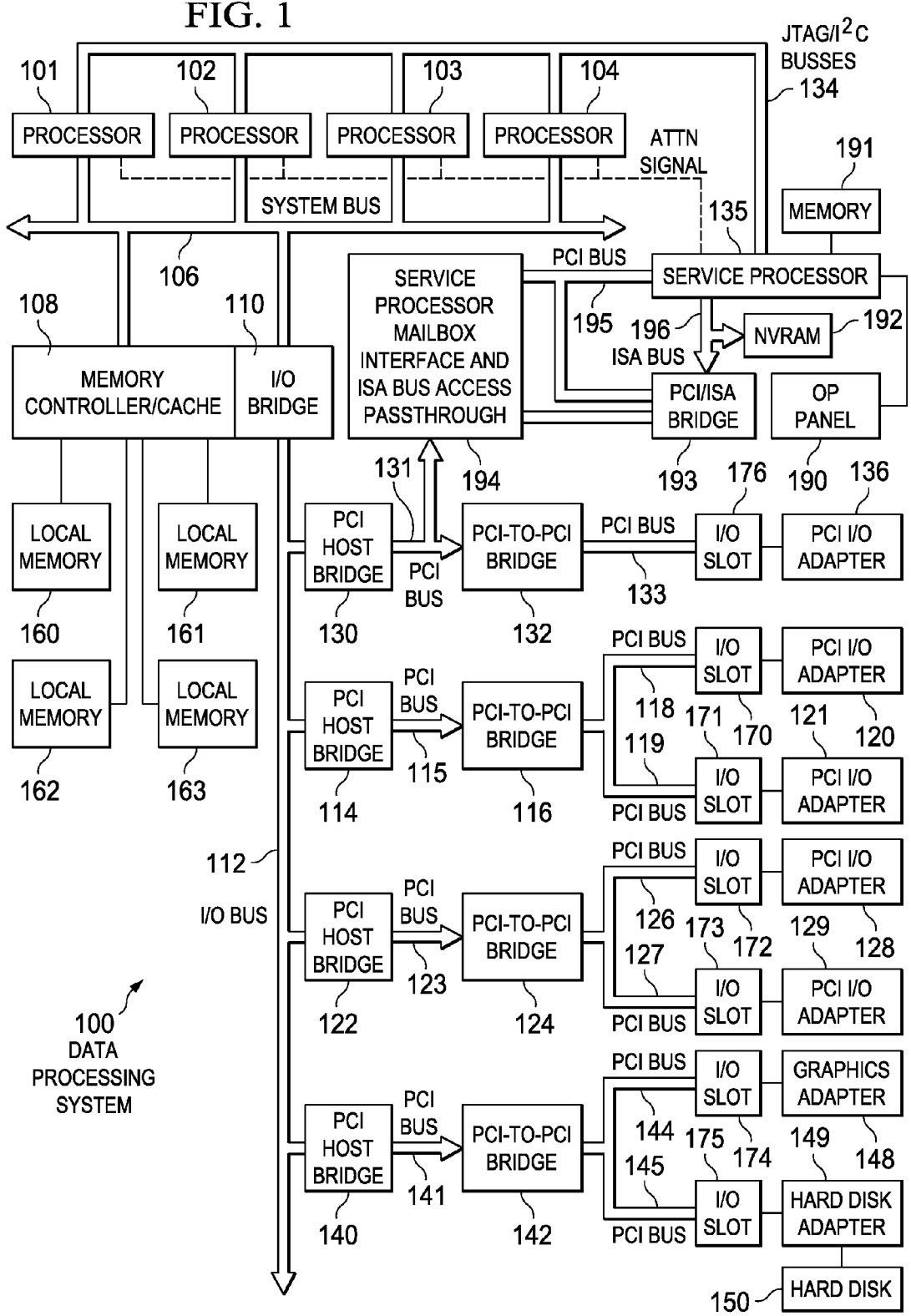
FIG. 1 is a block diagram of a data processing system in which illustrative embodiments may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures and in particular with reference to FIG. 1, a block diagram of a data processing system in which illustrative embodiments may be implemented is depicted. Data processing system 100 may be a symmetric multiprocessor (SMP) system including processors 101, 102, 103, and 104, which connect to system bus 106. These processors are hardware devices. Software or virtual processes are specifically identified as being virtual components. For example, virtual processor means a virtual or software process that runs on hardware. Processor means a hardware device. For example, data processing system 100 may be an IBM eServer, a product of International Business Machines Corporation in Armonk, N.Y., implemented as a server within a network. Alternatively, a single processor system may be employed. Also connected to system bus 106 is memory controller/cache 108, which provides an interface to local memories 160, 161, 162, and 163. I/O bridge 110 connects to system bus 106 and provides an interface to I/O bus 112. Memory controller/cache 108 and I/O bridge 110 may be integrated as depicted.

Data processing system 100 is a logical partitioned (LPAR) data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI I/O adapters 120, 121, 128, 129, and 136, graphics adapter 148, and hard disk adapter 149 may be assigned to different logical partitions. In this case, graphics adapter 148 connects to a display device (not shown), while hard disk adapter 149 connects to and controls hard disk 150.

Thus, for example, suppose data processing system 100 is divided into three logical partitions, P1, P2, and P3. Each of PCI I/O adapters 120, 121, 128, 129, and 136, graphics adapter 148, hard disk adapter 149, each of host processors 101, 102, 103, and 104, and memory from local memories 160, 161, 162, and 163 is assigned to each of the three partitions. In these examples, memories 160, 161, 162, and 163 may take the form of dual in-line memory modules (DIMMs). DIMMs are not normally assigned on a per DIMM basis to partitions. Instead, a partition will get a portion of the overall memory seen by the platform. For example, processor 101, some portion of memory from local memories 160, 161, 162, and 163, and I/O adapters 120, 128, and 129 may be assigned to logical partition P1; processors 102 and 103, some portion of memory from local memories 160, 161, 162, and 163, and PCI I/O adapters 121 and 136 may be assigned to partition P2; and processor 104, some portion of memory from local memories 160, 161, 162, and 163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX) operating system may be executing within partition P1, a second instance (image) of the AIX operating system may be executing within partition P2, and a Linux or OS/400 operating system may be operating within logical partition P3.

Peripheral component interconnect (PCI) host bridge 114 connected to I/O bus 112 provides an interface to PCI local bus 115. PCI I/O adapters 120 and 121 connect to PCI bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations support between four and eight I/O adapters (i.e. expansion slots for add-in connectors). Each PCI I/O adapter 120-121 provides an interface between data processing system 100 and input/output devices such as, for example, other network computers, which are clients to data processing system 100.

An additional PCI host bridge 122 provides an interface for an additional PCI bus 123. PCI bus 123 connects to a plurality of PCI I/O adapters 128 and 129. PCI I/O adapters 128 and 129 connect to PCI bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128-129. Consequently, data processing system 100 allows connections to multiple network computers.

A memory mapped graphics adapter 148 is inserted into I/O slot 174 and connects to I/O bus 112 through PCI bus 144, PCI-to-PCI bridge 142, PCI bus 141, and PCI host bridge 140. Hard disk adapter 149 may be placed into I/O slot 175, which connects to PCI bus 145. In turn, this bus connects to PCI-to-PCI bridge 142, which connects to PCI host bridge 140 by PCI bus 141.

A PCI host bridge 130 provides an interface for PCI bus 131 to connect to I/O bus 112. PCI I/O adapter 136 connects to I/O slot 176, which connects to PCI-to-PCI bridge 132 by PCI bus 133. PCI-to-PCI bridge 132 connects to PCI bus 131. This PCI bus also connects PCI host bridge 130 to the service processor mailbox interface and ISA bus access passthrough 194 and PCI-to-PCI bridge 132. Service processor mailbox interface and ISA bus access passthrough 194 forwards PCI accesses destined to the PCI/ISA bridge 193. NVRAM storage 192 connects to the ISA bus 196. Service processor 135 connects to service processor mailbox interface and ISA bus access passthrough logic 194 through its local PCI bus 195. Service processor 135 also connects to processors 101, 102, 103, and 104 via a plurality of JTAG/I$^2$C busses 134. JTAG/I$^2$C busses 134 are a combination of JTAG/scan busses (see IEEE 1149.1) and Phillips I$^2$C busses. However, alternatively, JTAG/I$^2$C busses 134 may be replaced by only Phillips I$^2$C busses or only JTAG/scan busses. All SP-ATTN signals of the host processors 101, 102, 103, and 104 connect together to an interrupt input signal of service processor 135. Service processor 135 has its own local memory 191 and has access to the hardware OP-panel 190.

When data processing system 100 is initially powered up, service processor 135 uses the JTAG/I$^2$C busses 134 to interrogate the system (host) processors 101, 102, 103, and 104, memory controller/cache 108, and I/O bridge 110. At the completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 101, 102, 103, and 104, memory controller/cache 108, and I/O bridge 110. Any error information for failures detected during the BISTs, BATs, and memory tests are gathered and reported by service processor 135.

If a meaningful and valid configuration of system resources is still possible after taking out the elements found to be faulty during the BISTs, BATs, and memory tests, then data processing system 100 is allowed to proceed to load executable code into local (host) memories 160, 161, 162, and 163. Service processor 135 then releases host processors 101, 102, 103, and 104 for execution of the code loaded into local memory 160, 161, 162, and 163. While host processors 101, 102, 103, and 104 are executing code from respective operating systems within data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 101, 102, 103, and 104, local memories 160, 161, 162, and 163, and I/O bridge 110.

Service processor 135 saves and reports error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for de-configuration during the current running session and future Initial Program Loads (IPLs). IPLs are also sometimes referred to as a "boot" or "bootstrap".

Data processing system 100 may be implemented using various commercially available computer systems. For example, data processing system 100 may be implemented using IBM eServer iSeries Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to illustrative embodiments.

Figure 2:
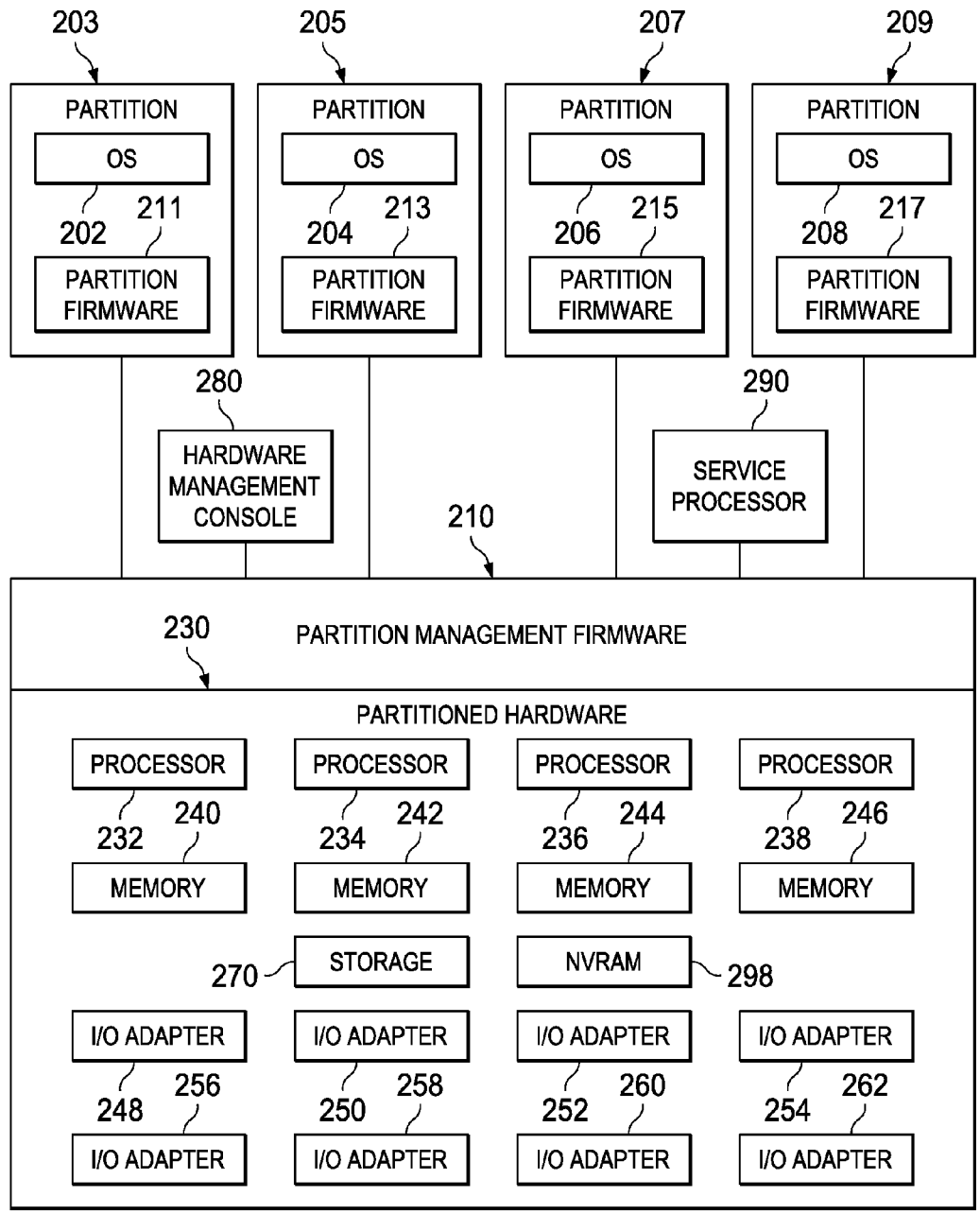
FIG. 2 is a block diagram of an exemplary logical partitioned platform in which illustrative embodiments may be implemented.

With reference now to FIG. 2, a block diagram of an exemplary logical partitioned platform is depicted in which illustrative embodiments may be implemented. The hardware in logical partitioned platform 200 may be implemented as, for example, data processing system 100 in FIG. 1. Logical partitioned platform 200 includes partitioned hardware 230, operating systems 202, 204, 206, 208, and partition management firmware 210. Operating systems 202, 204, 206, and 208 may be multiple copies of a single operating system or multiple heterogeneous operating systems simultaneously run on logical partitioned platform 200. These operating systems may be implemented using OS/400, which are designed to interface with a partition management firmware, such as PowerVM, which is available from International Business Machines Corporation. OS/400 is used only as an example in these illustrative embodiments. Of course, other types of operating systems, such as AIX and Linux, may be used depending on the particular implementation. Operating systems 202, 204, 206, and 208 are located in partitions 203, 205, 207, and 209. Partition management firmware software is an example of software that may be used to implement partition management firmware 210 and is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and non-volatile random access memory (non-volatile RAM).

Additionally, these partitions also include partition firmware 211, 213, 215, and 217. Partition firmware 211, 213, 215, and 217 may be implemented using initial boot strap code, IEEE-1275 Standard Open Firmware, and runtime abstraction software (RTAS), which is available from International Business Machines Corporation. When partitions 203, 205, 207, and 209 are instantiated, a copy of boot strap code is loaded onto partitions 203, 205, 207, and 209 by partition management firmware 210. Thereafter, control is transferred to the boot strap code with the boot strap code then loading the open firmware and RTAS. The processors associated or assigned to the partitions are then dispatched to the partition's memory to execute the partition firmware.

Partitioned hardware 230 includes processors 232, 234, 236, and 238, memories 240, 242, 244, and 246, input/output (I/O) adapters 248, 250, 252, 254, 256, 258, 260, and 262, and storage unit 270. Each of processors 232, 234, 236, and 238, memories 240, 242, 244, and 246, NVRAM storage 298, and I/O adapters 248, 250, 252, 254, 256, 258, 260, and 262 may be assigned to one of multiple partitions within logical partitioned platform 200, each of which corresponds to one of operating systems 202, 204, 206, and 208.

Partition management firmware 210 performs a number of functions and services for partitions 203, 205, 207, and 209 to create and enforce the partitioning of logical partitioned platform 200. Partition management firmware 210 is a firmware implemented virtual machine identical to the underlying hardware. Thus, partition management firmware 210 allows the simultaneous execution of independent OS images 202, 204, 206, and 208 by virtualizing all the hardware resources of logical partitioned platform 200.

Service processor 290 may be used to provide various services, such as processing of platform errors in the partitions. These services also may act as a service agent to report errors back to a vendor, such as International Business Machines Corporation. Operations of the different partitions may be controlled through a hardware management console, such as hardware management console 280. Hardware management console 280 is a separate data processing system from which a system administrator may perform various functions including reallocation of resources to different partitions.

Figure 3:
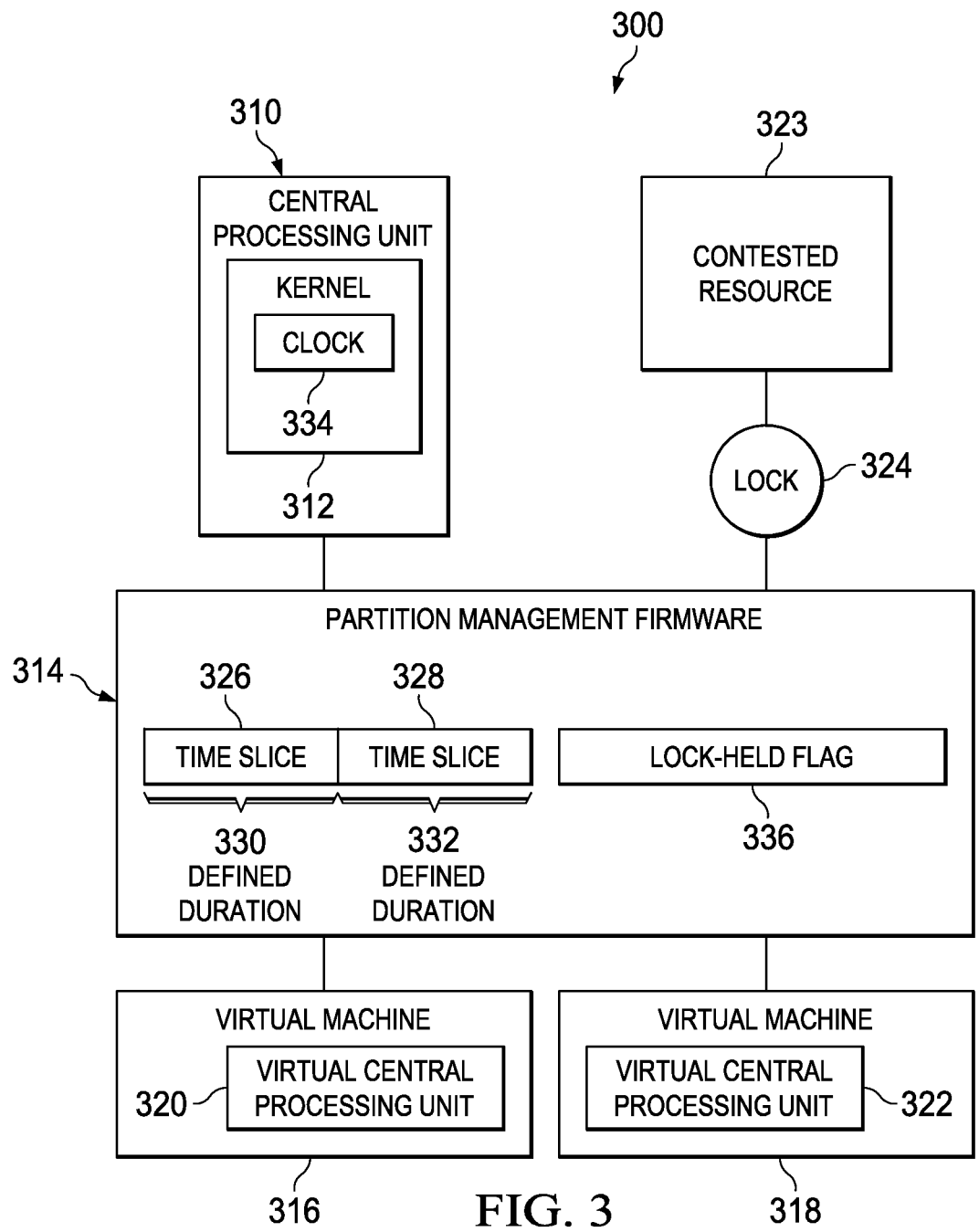
FIG. 3 is a data processing system for controlling access to a contested resource according to an illustrative embodiment.

Referring now to FIG. 3, a data processing system for controlling access to a contested resource is shown according to an illustrative embodiment. Data processing system 300 can be a data processing system, such as logical partitioned platform 200 of FIG. 2.

Data processing system 300 includes central processing unit 310. Central processing unit 310 is the portion of data processing system 300 that carries out instructions. Data processing system 300 is the primary element carrying out the computer's functions. Central processing unit 310 carries out each instruction of the program in sequence to perform the basic arithmetical, logical, and input/output operations of the system.

Data processing system 300 includes kernel 312. Kernel 312 is a bridge between applications and the actual data processing done at the hardware level. Kernel 312 manages the resources of data processing system 300 including communication between hardware and software components.

Data processing system 300 includes partition management firmware 314. Partition management firmware 314 can be, for example, partition management firmware 210 of FIG. 2. Partition management firmware, also known as a partition management firmware or virtual machine monitor, is software that provides virtualization to a logical partitioned platform by creating and enforcing the partitioning of a logical partitioned platform. Partition management firmware 314 provides virtualization for the execution of virtual machine 316 and virtual machine 318. Partition management firmware 314 enables the sharing of hardware resources among virtual machine 316 and virtual machine 318 executing on those hardware resources. Partition management firmware 314 enforces access restrictions between virtual machine 316 and virtual machine 318 executing on those hardware resources.

Virtual machine 316 and virtual machine 318 are controlled by partition management firmware 314 and execute on central processing unit 310. Each of virtual machine 316 and virtual machine 318 is a software implementation of a machine that executes programs like a physical machine. Virtual machine 316 and virtual machine 318 share the underlying resources of central processing unit 310, as well as other hardware attached to or incorporated into data processing system 300.

Virtual machine 316 includes virtual central processing unit 320. Virtual central processing unit 320 is the processor for virtual machine 316. Virtual central processing unit 320 executes instructions for virtual machine 316.

Virtual machine 318 includes virtual central processing unit 322. Virtual central processing unit 322 is the processor for virtual machine 318. Virtual central processing unit 322 executes instructions for virtual machine 318.

Data processing system 300 includes contested resource 323. Contested resource 323 is data, program instructions, or hardware that is utilized by both virtual central processing unit 320 and virtual central processing unit 322.

In order to maintain process synchronization, data processing system 300 includes lock 324. Lock 324 is a synchronization mechanism for enforcing limits on access to contested resource 323 by virtual machine 316 and virtual machine 318. Lock 324 ensures that virtual machine 316 and virtual machine 318 do not concurrently attempt to utilize contested resource 323. If virtual machine 316 is utilizing contested resource 323, virtual machine 318 must wait until virtual machine 316 finishes before virtual machine 318 is able to access contested resource 323. Conversely, if virtual machine 318 is utilizing contested resource 323, virtual machine 316 must wait until virtual machine 318 finishes before virtual machine 316 is able to utilize contested resource 323. In one illustrative embodiment, lock 324 may be implemented as part of a synchronization control.

In one illustrative embodiment, lock 324 is a spinlock. A spinlock is a lock where a thread wanting to access a contested resource simply waits in a loop repeatedly checking until the lock becomes available. Once the lock is available, the thread is able to access the contested resource. As the waiting thread "spins," it remains active but does not perform any task other than waiting on another thread to release the lock.

Each of virtual central processing unit 320 and virtual central processing unit 322 is allocated a time slice. Virtual central processing unit 320 is allocated time slice 326. Virtual central processing unit 322 is allocated time slice 328. Each of time slice 326 and time slice 328 is an allocated amount of time that the corresponding one of virtual central processing unit 320 and virtual central processing unit 322 is normally allowed to execute on central processing unit 310 without being preempted by another process. At the end of a time slice, kernel 312 chooses which process to run next on central processing unit 310 based on process priorities. Defined duration 330 is the length of time of time slice 326. Defined duration 332 is the length of time of time slice 328.

Data processing system 300 includes clock 334. In one illustrative embodiment, clock 334 can be implemented in kernel 312. Clock 334 is a timer mechanism that is, among other possible functions, capable of tracking defined duration 330 of time slice 326 and defined duration 332 of time slice 328.

In data processing systems that contain a partition management firmware and many guest operating systems, performance is a major concern. The partition management firmware controls access to a physical CPU core, and each guest operating system has virtual CPUs (VCPU). It is often the case that the total number of VCPUs for all the guest operating systems is greater than the number of physical central processing units in the system. The partition management firmware controls the time slices that each VCPU gets to execute on the physical CPU core.

In cases where the guest OS needs to take a spinlock, performance can be very bad if, during the time that VCPU holds a spinlock, it gets preempted and another VCPU gets a time slice and then tries to acquire that spinlock. This is commonly referred to as lockholder preemption.

Currently used processes employs "pause loop exiting" in which those VCPUs trying to acquire a spinlock trap to the partition management firmware. The partition management firmware then reschedules the VPCU that holds the lock. However, this method still has significant overhead and causes performance to slow.

The present invention overcomes the deficiencies of previously implemented pause loop exiting by implementing a hardware extension to the processor that allows lock instructions in operating system guests to conditionally trap to the partition management firmware. The conditional trapping to the partition management firmware only occurs when the virtual CPU is near the end of its allocated time slice. This can be measured by calculating the delta between current time and the next scheduled timer interrupt. For example, if a time slice is 10 ms long and the virtual CPU has run for 9.5 ms, the timer interrupt would be 0.5 ms in the future. If the lock instruction is set to trap in the last 1 ms of the time slice, it would trap in this instance when the virtual CPU attempts to acquire a lock. The partition management firmware would then end the time slice early and schedule a different virtual CPU who would be free to acquire the lock.

Data processing system 300 also includes lock-held flag 336. Lock-held flag 336 is an indication as to whether one of virtual central processing unit 320 or virtual central processing unit 322 currently holds lock 324.

The illustrative embodiments further overcome the deficiencies of previously implemented pause loop exiting by implementing a "lock-held flag" in the processor state. When the partition management firmware performs a context switch from a virtual CPU, the partition management firmware can look at the "lock-held flag" and decide to extend a time slice of that virtual CPU. This increases the chances of the lock being released before the virtual CPU is time sliced.

Figure 4:
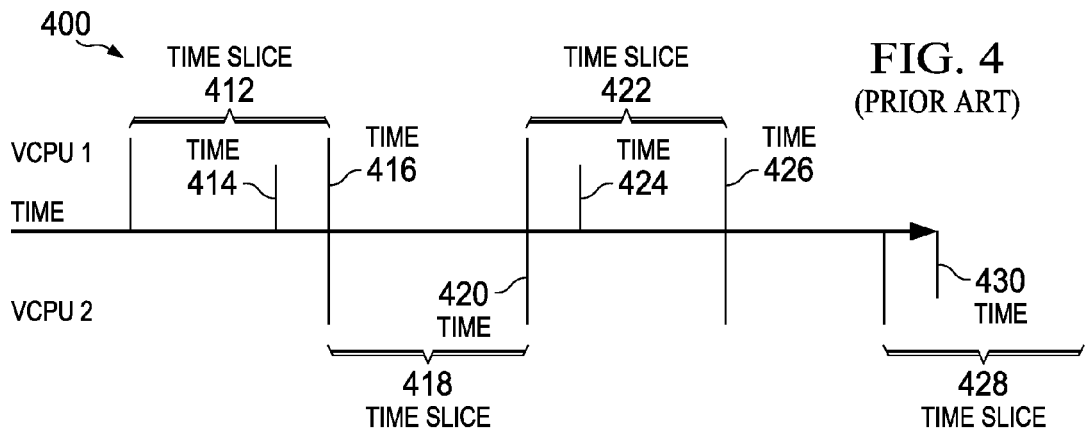
FIG. 4 is a timeline for lock acquisition and lock release in system having multiple virtual processors according to the prior art.

Referring now to FIG. 4, a timeline for lock acquisition and lock release in system having multiple virtual processors is shown according to the prior art. Timeline 400 is a representation of the relative times of various processing steps occurring within a data processing system, such as logical partitioned platform 200 of FIG. 2.

VCPU 1 is allocated processor usage during time slice 412. At time 414, VCPU 1 acquires a lock for a contested resource. At time 416, time slice 412 expires, and VCPU 1 is preempted by VCPU 2. VCPU 1 still holds the lock for the contested resource at the time that time slice 412 expires.

VCPU 2 is allocated processor usage during time slice 418. Because VCPU 1 still holds the lock for the contested resource, VCPU 2 is prevented from accessing the contested resource until the lock is released. Because VCPU 1 is not active in time slice 418, VCPU 1 cannot release the lock during time slice 418. VCPU 2 is therefore unable to access the contested resource and must instead wait for a subsequent time slice during which the lock has been released. At time 420, time slice 418 expires, and VCPU 2 is preempted by VCPU 1.

VCPU 1 is allocated processor usage during time slice 422. At time 424, VCPU 1 releases the lock for the contested resource. At time 426, time slice 422 expires, and VCPU 1 is preempted by VCPU 2.

VCPU 2 is allocated processor usage during time slice 428. Because VCPU 1 has released the lock for the contested resource, VCPU 2 can now access the contested resource. At time 430, VCPU 2 acquires the lock for the contested resource.

Figure 5:
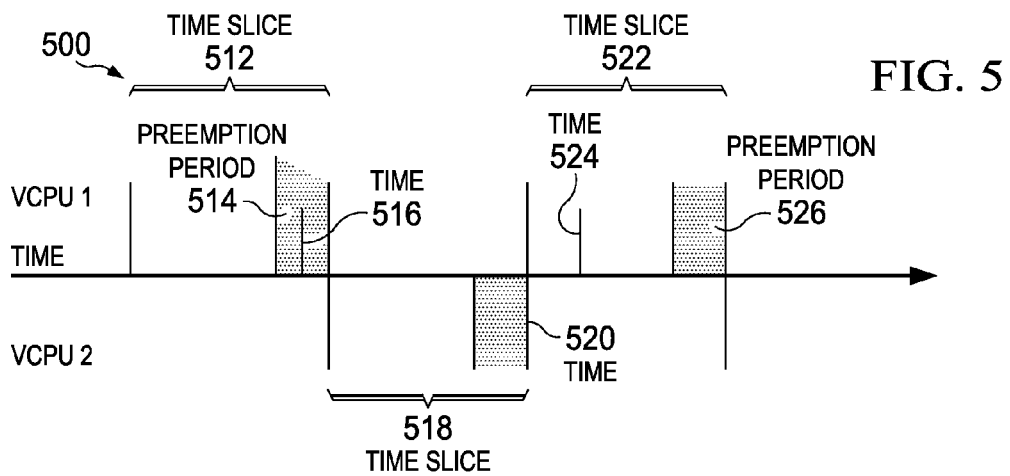
FIG. 5 is a timeline for deferred lock acquisition in system having multiple virtual processors according to an illustrative embodiment.

Referring now to FIG. 5, a timeline for deferred lock acquisition in system having multiple virtual processors is shown according to an illustrative embodiment. Timeline 500 is a representation of the relative times of various processing steps occurring within a data processing system, such as data processing system 300 of FIG. 3.

VCPU 1 is allocated processor usage during time slice 512. During preemption period 514, VCPU 1 attempts to acquire a lock for a contested resource. A preemption period is an end portion of the defined duration during which a VCPU is not permitted to acquire a lock. In one illustrative embodiment, the preemption period can be an absolute period of time, such as for example, the last 1 milliseconds of a defined duration of a time slice. In one illustrative embodiment, the preemption period can be a relative period of time, such as for example, the last 10% of a defined duration of a time slice.

VCPU 1 attempts to acquire the lock at time 516. Time 516 occurs during preemption period 514. Therefore, VCPU 1 is not permitted to acquire the lock. In one illustrative embodiment, a partition management firmware, such as partition management firmware 314 of FIG. 3, prevents VCPU 1 from acquiring the lock during preemption period 514. VCPU 1 must instead wait for a subsequent time slice during which the lock has been acquired. In one illustrative embodiment, VCPU 1 can spin for the remainder of time slice 512 until time 516. In one illustrative embodiment, a partition management firmware such as partition management firmware 314 of FIG. 3 can simply end time slice 512 after the partition management firmware determines that the lock was requested during preemption period 514.

VCPU 2 is allocated processor usage during time slice 518. At time 520, time slice 518 expires, and VCPU 2 is preempted by VCPU 1.

VCPU 1 is allocated processor usage during time slice 522. At time 524, VCPU 1 acquires the lock for the contested resource. Time 524 does not occur during preemption period 526 of time slice 522. Therefore, VCPU 1 is permitted to acquire the lock.

Figure 6:
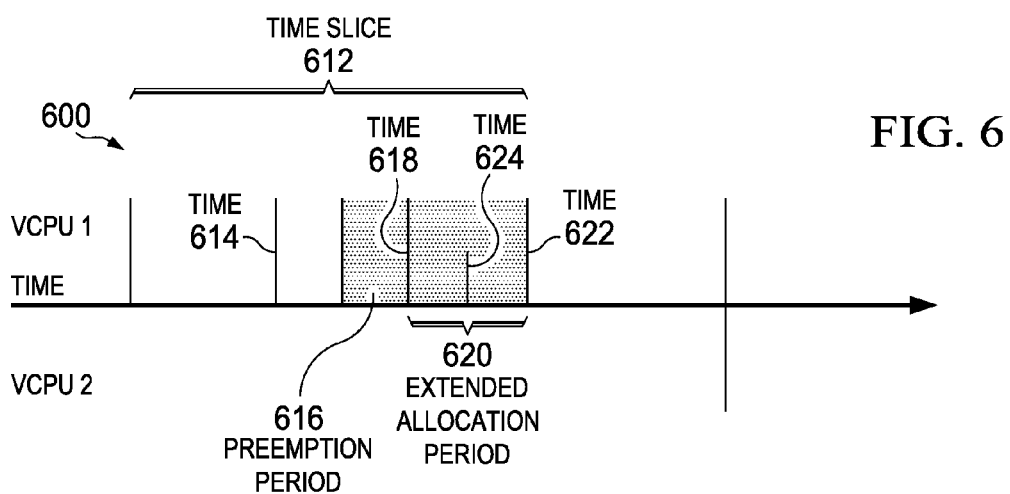
FIG. 6 is a timeline for lock acquisition and lock release in system having multiple virtual processors according to an illustrative embodiment.

Referring now to FIG. 6, a timeline for lock acquisition and lock release in system having multiple virtual processors is shown according to an illustrative embodiment. Timeline 600 is a representation of the relative times of various processing steps occurring within a data processing system, such as data processing system 300 of FIG. 3.

VCPU 1 is allocated processor usage during time slice 612. At time 614, VCPU 1 acquires a lock for a contested resource.

Time 614 occurs prior to preemption period 616. Therefore, VCPU 1 is permitted to acquire the lock. At time 618, time slice 612 expires. VCPU 1 still holds the lock for the contested resource at the time that time slice 612 expires.

A partition management firmware, such as partition management firmware 314 of FIG. 3 determines that VCPU 1 still holds the lock for the contested resource at the time that time slice 612 expires. The partition management firmware can make this determination by examining a lock-held flag, such as lock-held flag 336 of FIG. 3.

Because the lock is still held by VCPU 1, the partition management firmware can extend the time slice allocated to VCPU 1 beyond time 618. In one illustrative embodiment, this extended allocation period can be an absolute period of time, such as for example, an additional 1 millisecond of a defined duration of a time slice. In one illustrative embodiment, the extended allocation period can be a relative period of time, such as for example, an additional 10% of a defined duration of a time slice.

The partition management firmware extends the time slice allocated to VCPU 1 by extended allocation period 620 to time 622. VCPU 1 releases the lock at time 624 prior to the expiration of extended allocation period 620 at time 622. At time 622, extended allocation period 620 expires, and VCPU 1 is preempted by VCPU 2.

Figure 7:
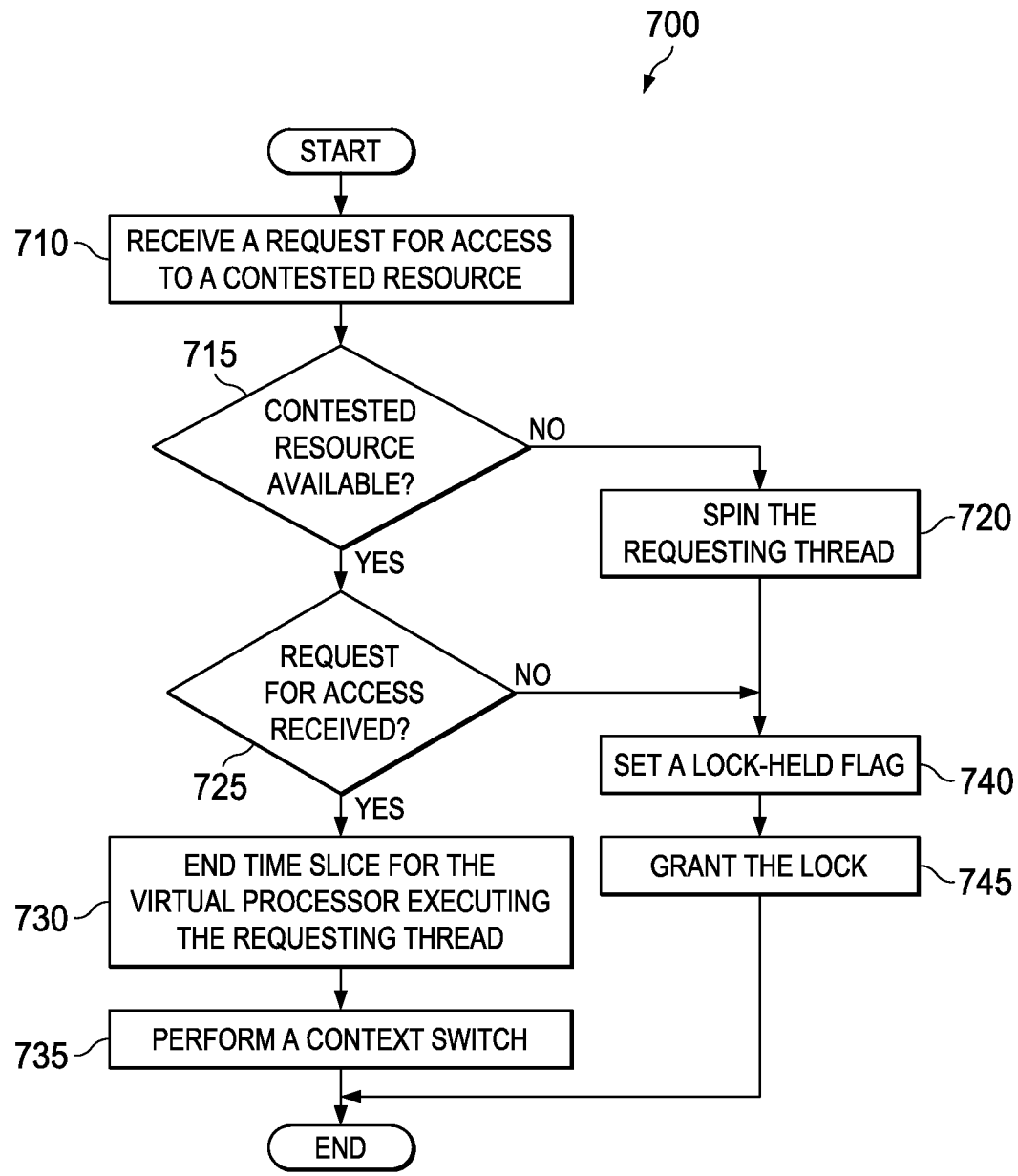
FIG. 7 is a flowchart for controlling access to a contested resource according to an illustrative embodiment.

Referring now to FIG. 7, a flowchart for controlling access to a contested resource is shown according to an illustrative embodiment. Process 700 is a process executing on a computer system, such as data processing system 300 of FIG. 3. Process 700 can execute within partition management firmware, such as partition management firmware 314 of FIG. 3.

Process 700 begins by receiving a request for access to a contested resource (step 710). The contested resource can be, for example, contested resource 323 of FIG. 3.

Responsive to receiving the contested resource, process 700 determines whether the contested resource is available (step 715). In one illustrative embodiment, the process determines whether the contested resource is available by determining whether a lock is currently held for the contested resource. The lock can be, for example, lock 324, of FIG. 3.

Responsive to determining that the contested resource is not available ("no" at step 715), process 700 spins the requesting thread (step 720). Process 700 then iterates back to step 715 to wait for the resource to become available.

Responsive to determining that the contested resource is available ("yes" at step 715), process 700 determines whether the request for access to the contested resource is received during a preemption period (step 725). The preemption period is an end portion of the defined duration during which a VCPU is not permitted to acquire a lock. The preemption period can be, for example, one of preemption period 514 and preemption period 526 of FIG. 5.

Responsive to determining that the request for access was received during the preemption period ("yes" at step 725), process 700 ends a time slice for the virtual processor executing the requesting thread (step 730). Because the request occurred during the preemption period, the requesting VCPU 1 is not permitted to acquire the lock. VCPU 1 must instead wait for a subsequent time slice during which the lock has been acquired. Process 700 then performs a context switch (step 735), with the process terminating thereafter.

Returning now to step 725, responsive to determining that the request for access was not received during the preemption period ("no" at step 725), process 700 sets a lock-held flag (step 740). The lock-held flag can be, for example, lock-held flag 336 of FIG. 3. Process 700 then grants the lock for the contested resource (step 745), with the process terminating thereafter.

Figure 8:
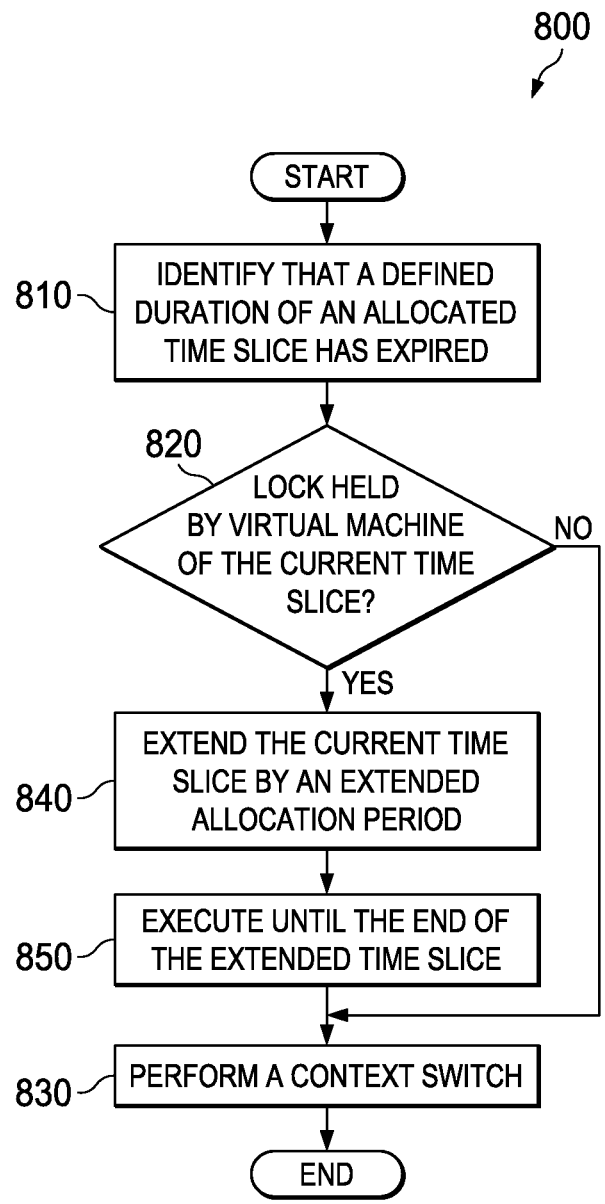
FIG. 8 is a flowchart for extending an allocated time slice according to an illustrative embodiment.

Referring now to FIG. 8, a flowchart for extending an allocated time slice is shown according to an illustrative embodiment.

Process 800 begins by identifying that a defined duration of an allocated time slice has expired (step 810). The allocated time slice can be, for example, one of time slice 326 and time slice 328 of FIG. 3.

Responsive to identifying that a defined duration of an allocated time slice has expired, process 800 determines whether a lock is held by the virtual machine of the current time slice (step 820). In one illustrative embodiment, process 800 can identify whether a lock is held by examining a lock-held flag. The lock-held flag can be, for example, lock-held flag 336 of FIG. 3.

Responsive to determining that a lock is not held by the virtual machine of the current time slice ("no" at step 820), the process performs a context switch, (step 830), with the process terminating thereafter.

Responsive to determining that a lock is held by the virtual machine of the current time slice ("yes" at step 820), process 800 extends the current time slice by an extended allocation period (step 840). The extended allocation period allows a brief time extension during which the lock may be released.

Responsive to extending the current time slice by the extended allocation period, process 800 executes until the end of the extended time slice (step 850). Responsive to reaching the end of the extended time slice, process 800 performs a context switch, (step 830), with the process terminating thereafter.

Thus, illustrative embodiments of the present invention provide a computer implemented method, computer usable program code, and a data processing system for controlling access to a contested resource. When a lock acquisition request is received from a virtual machine, the partition management firmware determines whether the lock acquisition request is received within a preemption period of a time slice allocated to the virtual machine. If the lock acquisition request is received within the preemption period, the partition management firmware ends the time slice early and performs a context switch to prevent possible lockholder preemption situations.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer implemented method for controlling access to a contested resource, the computer implemented method comprising:
   receiving a lock acquisition request from a virtual machine in a computer system, wherein the computer system is a computer and wherein the computer is hardware;
   determining, by the computer system, whether the lock acquisition request for a lock is received within a preemption period of a time slice of a defined duration allocated to the virtual machine;
   responsive to determining that the lock acquisition request is received within a preemption period, ending, by the computer system the time slice prior to a conclusion of the defined duration without granting the lock to the virtual machine;
   responsive to determining that the lock acquisition request is not received within the preemption period, setting a flag indicating that the virtual machine holds the lock; and to grant the lock to the virtual machine;
   responsive to an ending of the defined duration, determining whether the flag indicating that the virtual machine holds the lock is set;
   responsive to determining that the flag indicating that the virtual machine holds the lock is set, extending the time slice creating an extended time slice allocated to the virtual machine to a duration greater than the defined duration; and
   responsive to expiration of the extended time slice, to perform a context switch to a second virtual machine, wherein the context switch is performed by the partition management firmware.

2. The computer implemented method of claim 1, wherein the lock is a spinlock.

3. The computer implemented method of claim 1, further comprising:
   responsive to determining that the lock acquisition request is received within the preemption period, executing a software invoked interrupt, wherein the software invoked interrupt extends the time slice allocated to the virtual machine.

4. The computer implemented method of claim 1, wherein the preemption period is a last 10% of the defined duration of the time slice.

5. A computer implemented method for controlling access to a contested resource, the method comprising:
   receiving a lock acquisition request from a first virtual machine for acquisition of a lock;
   determining whether the lock acquisition request is received within a preemption period of a time slice of a defined duration allocated to the first virtual machine;
   determining whether the lock is held by a second virtual machine;
   responsive to determining that the lock is not held by the second virtual machine, and responsive to determining that the lock acquisition request is not received within the preemption period, granting the lock to the first virtual machine, setting a flag indicating that the first virtual machine holds the lock; and
   granting the lock to the first virtual machine,
   responsive to the ending of a defined duration of a time slice allocated to the first virtual machine, determining whether the flag indicating that the first virtual machine holds the lock is set;
   responsive to determining that the flag indicating that the first virtual machine holds the lock is set, extending the time slice allocated to the first virtual machine to a duration greater than the defined duration; and
   responsive to expiration of the extended time slice, performing a context switch to the second virtual machine, wherein the context switch is performed by a partition management firmware.

6. A computer system, wherein the computer system is a computer and wherein the computer is hardware, the computer system comprising:
   a processor;
   a memory, wherein the memory has computer-implemented instructions encoded thereon for controlling access to a contested resource;
   a bus system connecting the memory to the processor, wherein the processor includes a hardware extension allowing a lock instruction in a guest operating system to conditionally trap to a partition management firmware, wherein the processor executes the computer-implemented instructions:
   to receive a lock acquisition request from a virtual machine;
   to determine whether the lock acquisition request for a lock is received within a preemption period of a time slice of a defined duration allocated to the virtual machine;
   responsive to determining that the lock acquisition request is received within the preemption period, to end the time slice prior to a conclusion of the defined duration without granting the lock to the virtual machine;
   responsive to determining that the lock acquisition request is not received within the preemption period, to set a flag indicating that the virtual machine holds the lock; and to grant the lock to the virtual machine;
   responsive to an ending of the defined duration, to determine whether the flag indicating that the virtual machine holds the lock is set;
   responsive to determining that the flag indicating that the virtual machine holds the lock is set, to extend the time slice creating an extended time slice allocated to the virtual machine to a duration greater than the defined duration; and responsive to expiration of the extended time slice, to perform a context switch to a second virtual machine, wherein the context switch is performed by the partition management firmware.

7. The computer system of claim 6, wherein the lock is a spinlock.

8. The computer system of claim 6, wherein the processor further executes the computer-implemented instructions:

responsive to determining that the lock acquisition request is received within the preemption period, to execute a software invoked interrupt, wherein the software invoked interrupt extends the time slice allocated to the virtual machine.

9. The computer system of claim 6, wherein the preemption period is a last 10% of the defined duration of the time slice.

10. A computer program product for controlling access to a contested resource in a computer system, wherein the computer system is a computer and wherein the computer is hardware, the computer program product comprising:

a computer-readable storage medium, not including signals and having computer-readable program code embodied therewith, the computer-readable program code comprising:

computer-readable program code configured to receive a lock acquisition request from a virtual machine;

computer-readable program code configured to determine whether the lock acquisition request for a lock is received within a preemption period of a time slice of a defined duration allocated to the virtual machine;

computer-readable program code configured, responsive to determining that the lock acquisition request is received within the preemption period, to end the time slice prior to a conclusion of the defined duration without granting the lock to the virtual machine;

computer-readable program code configured, responsive to determining that the lock acquisition request is not received within the preemption period, to set a flag indicating that the virtual machine holds the lock; and computer-readable program code configured, further responsive to determining that the lock acquisition request is not received within the preemption period, to grant the lock to the virtual machine;

computer-readable program code configured, responsive to an ending of the defined duration, to determine whether the flag indicating that the virtual machine holds the lock is set; and computer-readable program code configured, responsive to determining that the flag indicating that the virtual machine holds the lock is set, to extend the time slice allocated to the virtual machine to a duration greater than the defined duration; and computer-readable program code configured, responsive to expiration of the extended time slice, to perform a context switch to a second virtual machine, wherein the context switch is performed by a partition management firmware.

11. The computer program product of claim 10, the computer-readable program code further comprising:

computer-readable program code configured, responsive to determining that the lock acquisition request is received within the preemption period, to execute a software invoked interrupt, wherein the software invoked interrupt extends the time slice allocated to the virtual machine.

* * * * *